(No Model.) 6 Sheets—Sheet 1.

G. M. MILLS.
ICE CREAM FREEZER.

No. 314,863. Patented Mar. 31, 1885.

Witnesses. Inventor.
Will hPowell. Geo. M. Mills
Wm Musser. By Connolly Bros.

(No Model.) 6 Sheets—Sheet 3.

G. M. MILLS.
ICE CREAM FREEZER.

No. 314,863. Patented Mar. 31, 1885.

Witnesses.
Will S. Powell.
Wm. Musser.

Inventor.
Geo. M. Mills
By Connolly Bros.

(No Model.) 6 Sheets—Sheet 4.
G. M. MILLS.
ICE CREAM FREEZER.

No. 314,863. Patented Mar. 31, 1885.

Witnesses.  
Inventor.  
Geo. M. Mills  
By Connolly Bros.

(No Model.) 6 Sheets—Sheet 5.
G. M. MILLS.
ICE CREAM FREEZER.
No. 314,863. Patented Mar. 31, 1885.
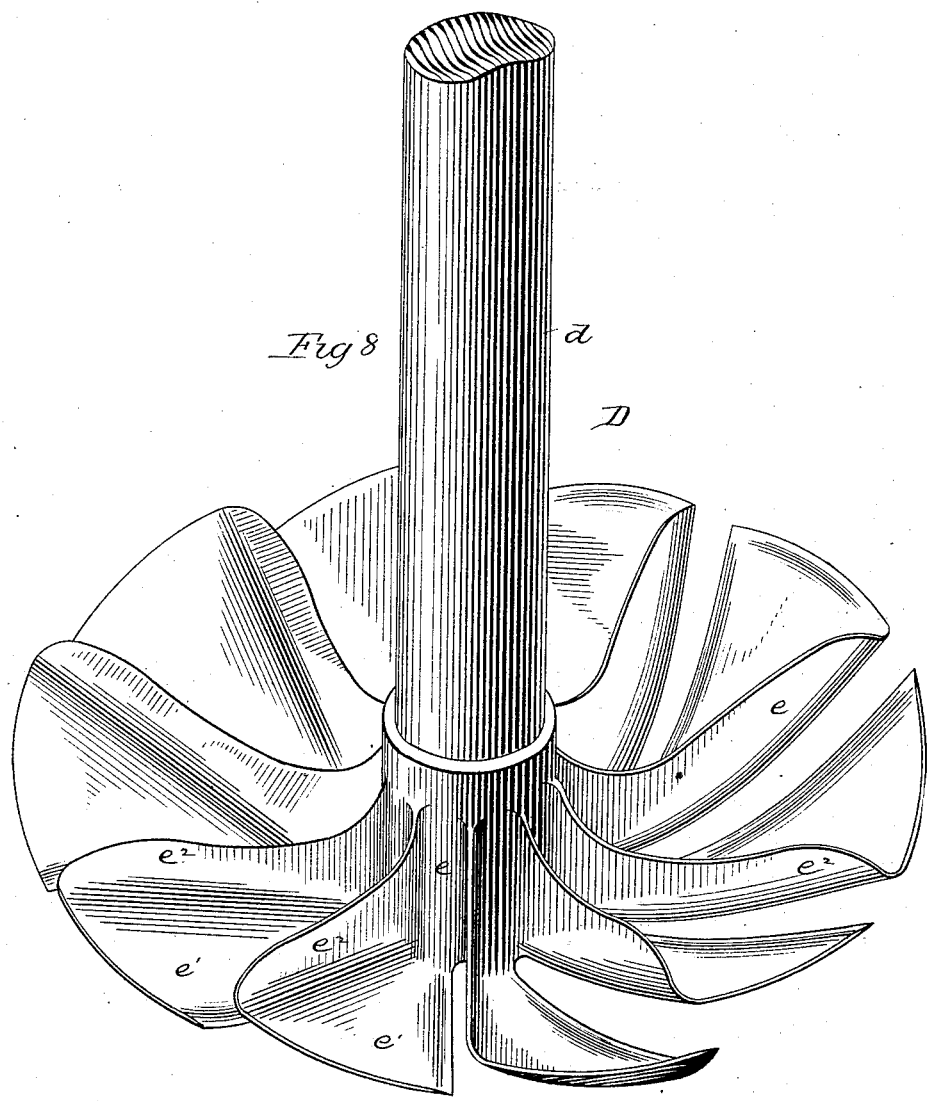

(No Model.)  6 Sheets—Sheet 6.
G. M. MILLS.
ICE CREAM FREEZER.
No. 314,863. Patented Mar. 31, 1885.
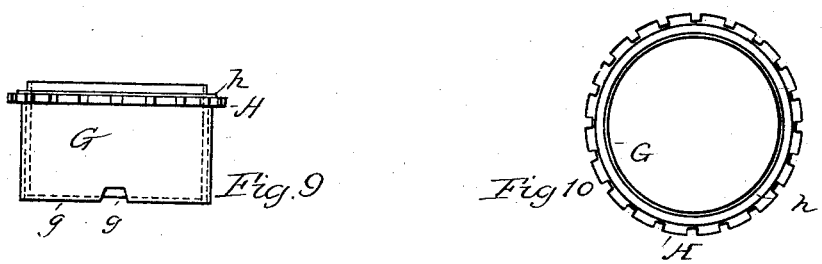
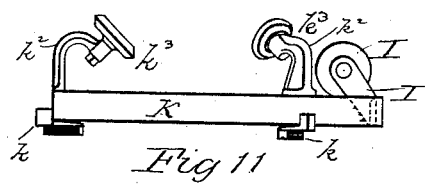
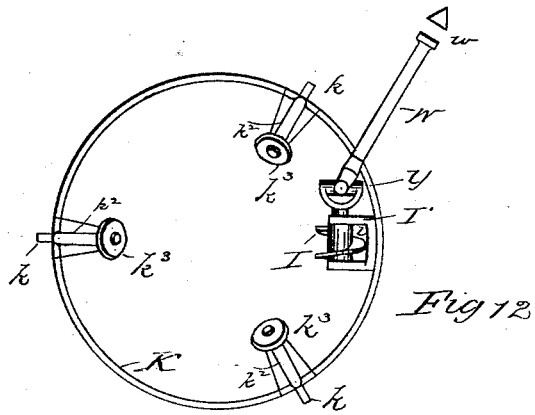
WITNESSES
INVENTOR
George M. Mills
By Connolly Bros.
Attorneys

UNITED STATES PATENT OFFICE.

GEORGE M. MILLS, OF PHILADELPHIA, PENNSYLVANIA.

ICE-CREAM FREEZER.

SPECIFICATION forming part of Letters Patent No. 314,863, dated March 31, 1885.

Application filed June 13, 1884. (No model.)

*To all whom it may concern:*

Be it known that I, GEORGE M. MILLS, a citizen of the United States, residing at the city of Philadelphia, in the county of Philadelphia and State of Pennsylvania, have invented certain new and useful Improvements in Ice-Cream Freezers; and I do hereby declare the following to be a full, clear, and exact description of the invention, reference being had to the accompanying drawings, which form part of this specification, in which—

Figure 1:
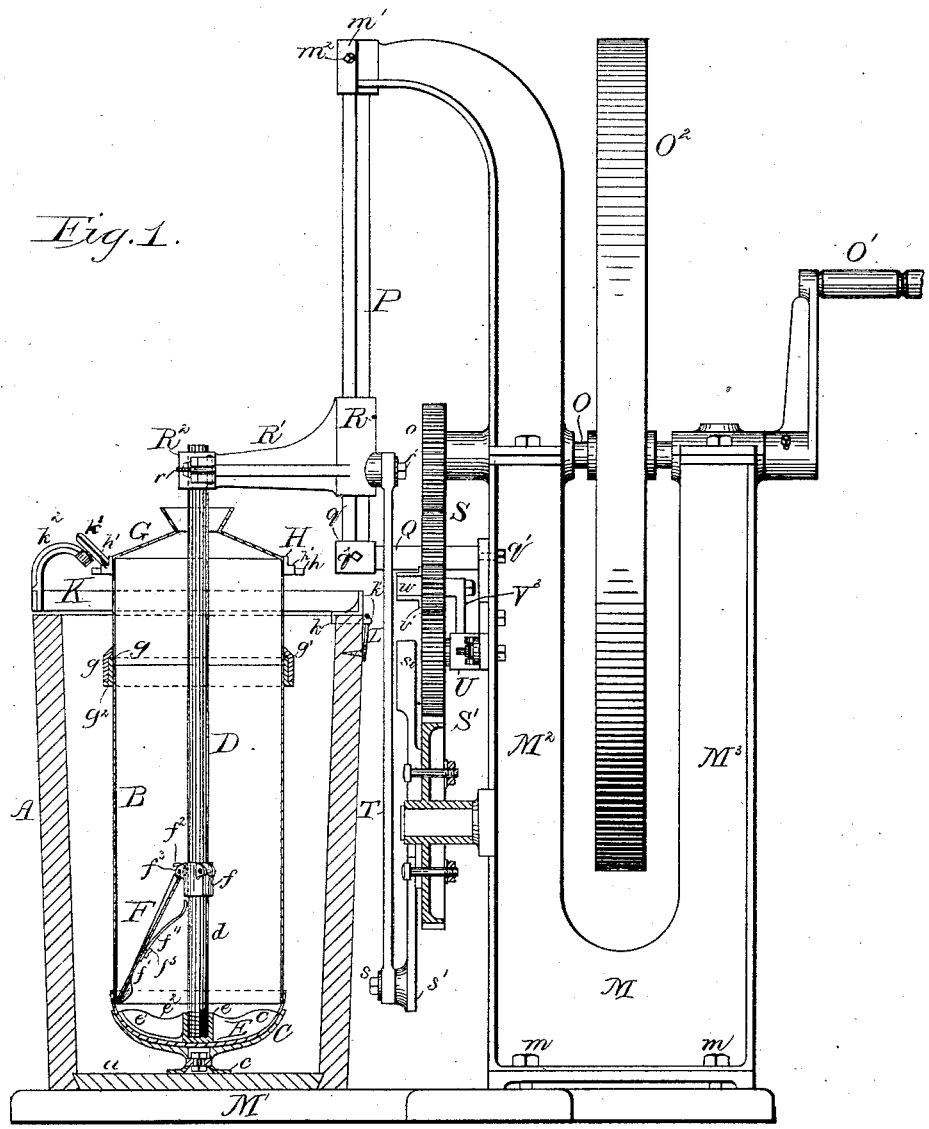
Figure 2:
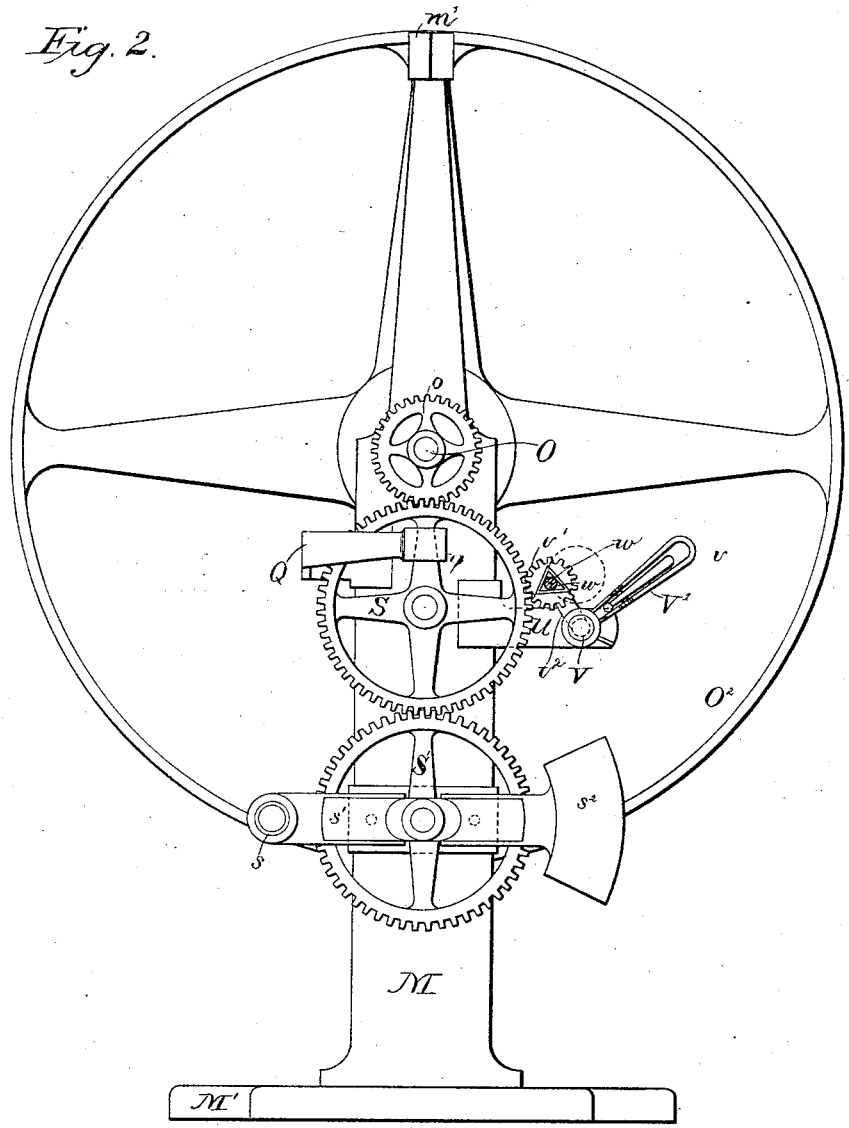
Figure 3:
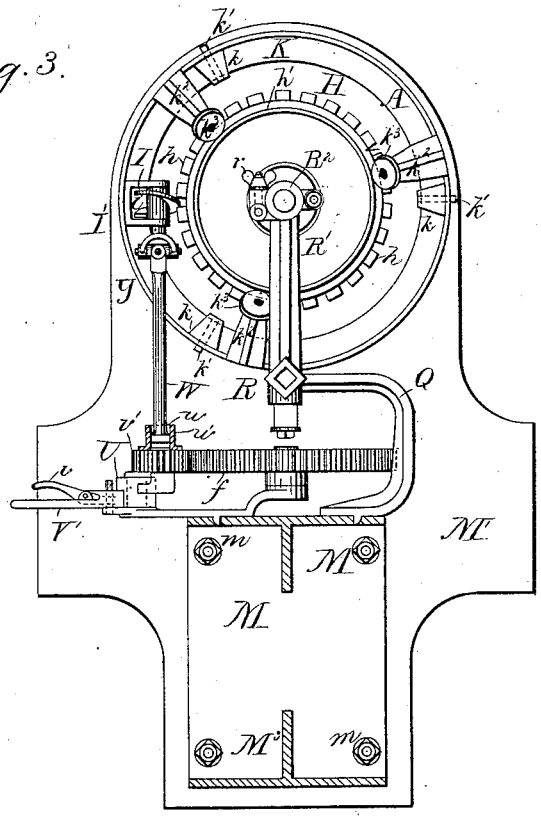
Figure 4:
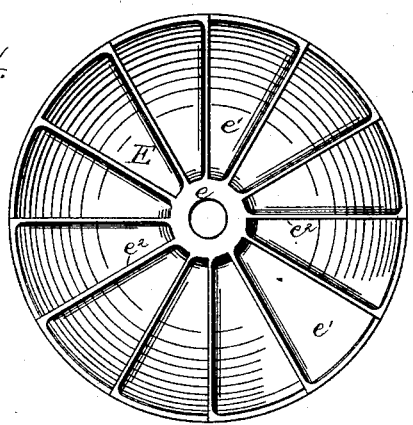
Figure 5:
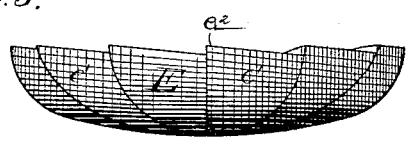
Figure 6:
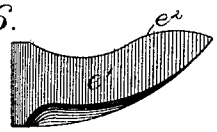
Figure 7:
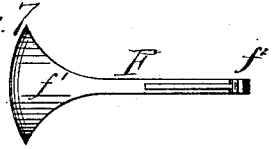

Figure 1 is a side elevation, partly in vertical section. Fig. 2 is a vertical section of driving mechanism and support. Fig. 3 is a plan, partly in section. Fig. 4 is a plan, Fig. 5 a side elevation, and Fig. 6 a detail, of dasher. Fig. 7 is a plan of the scraper-blade. Fig. 8 is a perspective of dasher-staff with beater attached. Fig. 9 is a side elevation, and Fig. 10 a plan, of detachable neck of can. Fig. 11 is a side elevation, and Fig. 12 a plan, of detachable tub-ring with anti-friction bearing-wheels, worm-wheel, shaft, and universal coupling.

My invention has for its object to provide an ice-cream freezer having a new principle or mode of operation, which shall effect the production of a smoother and more uniform quality of ice-cream than has heretofore been obtained.

My improvements relate to the dasher, to the scraper thereon, and to the mechanism for rotating the can; and they consist in the peculiar construction and combinations of parts hereinafter fully set forth and claimed.

Referring to the accompanying drawings, A designates the tub which holds the ice, and inside of which is placed the can B. Said can rests upon a tripartite support, C, swiveled in a foot, $c$, secured to the bottom $a$ of said tub, so that the can and its support can be freely rotated, turning on a vertical axis.

D is a dasher, designed and adapted to have a vertically-reciprocating or up-and-down movement communicated to it by the mechanism hereinafter fully explained. Said dasher consists of a staff, $d$, to the bottom of which is attached a device, E, somewhat resembling a propeller-wheel. For convenience of designation, I will call this device the "beater." It consists of a central hub, $e$, from which spring or extend a series of flaring upwardly-curved blades, $e'$ $e'$—that is, blades which widen horizontally and curve upwardly as they recede from the hub. One edge of each blade has a vertical flange, $e^2$, which is in line with the other flangeless edge of the next blade. There may be as many of these blades to each beater as desired. In practice I use and I recommend that eight, ten, or twelve blades, according to the size of the can, be employed. The hub and blades of the beater are preferably cast in one piece, and the former is threaded for the reception of a screw end or ferrule on the staff $d$. The beater-blades are of such length that they reach nearly to the walls of the can, a slight clearance being left, as shown.

Owing to the peculiar shape of the beater-blades, when the dasher moves down, the cream in the middle or center of the can is thrown outwardly toward the walls or coolest part of the vessel, and is at the same time smoothed or smeared by said blades, and when said dasher moves upwardly the cream near the walls of the vessel is thrown inwardly by said blades toward the center or middle, thus maintaining a constant circulation and uniformity of temperature of the cream. As the can rotates, as hereinafter described, its bottom is scraped by the lower edges of the beater-blades, the scraped cream passing upwardly through the spaces between the said blades.

F represents the scraper, which consists of a collar, $f$, fastened to the staff $d$ with swinging pendent blades $f'$. Said blades are of the peculiar shape shown, each having a hook, $f^2$, at its upper end, engaging with a pintle, $f^3$, on the collar, and thus forming an open hinge or loose connection. The lower outer extremities of the blades $f'$ touch the walls of the can A, and are kept in contact therewith by springs $f^4$, secured to the under side of said blades by screws $f^5$, and bearing against the collar $f$ at their upper ends. The neck of the can is shown at G, and is represented as detached in Figs. 9 and 10 of the drawings. Its lower edge has two flanges, $g$ $g'$, the outer one of which is a cast ring with studs or projections, which enter recesses in a similar ring, $g^2$, secured to the upper edge of the can-body, so that both the body and neck will be locked and rotate together. The inner flange of said neck extends down inside the upper edge of the can and forms a protection for the joint. As will be seen, the neck may be readily applied to an ordinary can having a locking-ring, and may be as readily removed by simply lifting it off; and, as already explained, as the can, when in use in the freezer, rests upon a swiveled support, it follows that I may employ an ordinary can in the freezing operation, and when the cream has been frozen can simply remove said can and substitute another ordinary one in its place. By these means the cream may be sold or otherwise dispensed directly from the can in which it was frozen, thus saving the transfer required from one can to another where specially-constructed cans not adapted to be used for the purpose of having the cream sold directly from them are employed in the freezing operation. Hence, also, I do not require to specially construct a can for my freezer, but can employ the ordinary cans with locking-ring on the neck to be found in the market.

H is a ring or annular rack secured around the outside of the top G near its upper edge, and having cogs or teeth $h$, with which engages a worm-wheel, I, on the shaft $i$. Said worm-wheel shaft has its bearings in a U-shaped bracket, I', fastened to the inner wall of the ring K, which latter rests on the upper edge of the tub A, and is secured thereto by feet or projections $k$, cast on said ring, and by pivoted hooks L, which are fastened to the tub A and engage with studs $k'$ on said ring. To said ring are also secured curved standards or brackets $k^2$, on which are sustained anti-friction guide-rollers $k^3$, which bear against and ride on a smooth shoulder or track, $h'$, on the ring or annular rack H. The ring K is shown detached in Figs. 11 and 12, as it has to be removed from the tub A when it is desired to take out or insert a can in said tub. This removal can be readily effected by first unlatching the hooks and then lifting off the ring. As shown, the ring carries with it the worm-wheel, the universal coupling, and the shaft which said coupling joins to said wheel.

M represents a housing fastened by screws or bolts $m$ to the base M', on which the tub A also rests. Said housing comprises two vertical standards, $M^2 M^3$, on which a driving-shaft, O, having a handle, O', and fly-wheel $O^2$, has its bearings. The standard $M^2$ is curved at its upper end and formed with a socket or opening, $m'$, for the upper end of a guide or slide rod, P, the lower end of the latter fitting in a socket, $q$, in the end of a curved bracket, Q, secured by a bolt, $q'$, to the housing-standard $M^2$. The rod P is fastened in the sockets or openings $m' q$ by set-screws $m^2 q^2$.

R is a sliding collar fitted and adapted and designed to move vertically on the slide-rod P, having an angular bore corresponding to the cross-section of said rod.

From the collar R there projects an arm, R', terminating in a hinged box or coupling, $R^2$, having a fastening-screw, $r$, forming a connection for said arm with the dasher-staff $d$.

On the inner end of shaft O is a pinion, $o$, gearing with a wheel, S, which in turn meshes with another gear-wheel, S', both said wheels being supported on the standard $M^2$. The wheel S' has a wrist-pin, $s$, to which is fastened the end of a pitman, T, whose other end is secured to a similar pin, $r'$, projecting from the collar R, whereby when the shaft O is rotated the collar R will be caused to slide up and down, thus communicating a vertically-reciprocating motion to the dasher. The wrist-pin $s$ is carried on a plate, $s'$, attached to and adjustable radially on the wheel S', so as to vary the extent of movement of the dasher, and a radially-adjustable balance-weight, $s^2$, is also carried on said wheel S'. At the same time that the dasher is reciprocated vertically, as described, the can B is rotated on its vertical axis by the following means: U is a bracket secured to standard $M^2$, and carrying near its outer end a rock-shaft, V, having a lever or arm, V', with a spring pawl or latch, $v$, the toe of which enters a hole in said bracket when the pinion $v'$ is in engagement with the wheel S, and rests upon an incline on said bracket when said pinion and wheel are out of engagement. Said rock-shaft has an arm, $V^2$, which affords a bearing for and carries said pinion $v'$, which latter, by the movement of lever V' producing a rocking of shaft V, may be brought into and out of engagement with the wheel S. The position of the parts when the pinion is in engagement with the wheel is shown in the drawings in full lines, and when out of engagement, or with the pinion unshipped, in dotted lines. To the outer face or side of pinion $v'$ is attached an angular socket-piece, $w$, receiving the angular end or head $w'$ of a shaft, W, which is connected by a universal coupling, Y, with the shaft $i$ of the worm-wheel I; hence, when pinion $v'$ is in gear with wheel S and shaft O is revolved, the can B will turn on its vertical axis at the same time that the dasher is reciprocated vertically, and if it be desired to reciprocate the dasher without rotating the can, this may be accomplished by throwing the pinion $v'$ out of engagement with wheel S by moving lever V'. It will be noted that the operative gear-wheels stand beside the tub and can, and not over the same, as hitherto. The advantages of this arrangement are, first, the freezer is not top-heavy, but on the contrary has a secure rest or bearing on its base; second, access to the top of the can for inspection, testing, &c., is not impeded, the top may be left open, and there is no danger of oil, &c., dropping from the gearing into the can; and, third, I am enabled to give the dasher a much longer stroke than is practicable where the gearing is overhead. Inasmuch as machine-freezers are usually employed by confectioners and located in cellars having low ceilings, it has been found impracticable to locate the gearing overhead in large machines and get a long movement for the dasher. With my arrangement, however, the gearing being placed beside the tub, as shown and explained, I am readily enabled to obtain a vertical stroke equal to the full depth of the largest can in use in ice-cream freezers.

In operation an ordinary can having a round or convex bottom is placed in the tub A, resting on the support C. The detachable neck G is then (or before the can is placed in the tub) applied to the can, and the cream then, if not before, poured into said can. Ice is then filled into the tub around the can in the usual manner. The ring K is then placed on the top of the tub and fastened thereto, the rollers $k^3 k^3$ bearing down or resting upon the track or shoulder of the annular ring or rack H. At the same time the angular end of the shaft W is slipped into the socket $w$, thus establishing connection between the gearing and the can. The dasher being duly let down into the can, the operation of freezing is proceeded with by turning the handle O. This causes the can to rotate and the dasher to vertically reciprocate. When it is desired to continue moving the dasher without rotating the can, the gearing is unshipped, as already explained, and the revolution of the handle continued. When the freezing is completed, the ring K is loosened and lifted off the tub and the dasher raised out of the can. The latter is then lifted out of the tub and its detachable neck removed, and, if desired, applied at once to another ordinary can with locking-ring on its neck.

What I claim as my invention is as follows:

1. An ice-cream dasher having a staff, $d$, and a beater comprising a hub with radial curved blades, said staff and beater being adapted and designed to be reciprocated vertically, substantially as and for the purpose set forth.

2. The beater E, consisting of a hub, $e$, with flaring upwardly-curved blades $e'$, having each a vertical flange on one edge, substantially as shown and described.

3. The combination, with dasher-staff D, of pendent hinged scrapers $f'$, substantially as shown and described.

4. The combination, with dasher-staff $d$, of collar F, having pintles $f^3$, and pendent blades $f'$, having a hinge-connection with said collar, substantially as shown and described.

5. The combination, with collar F on dasher-staff $d$, and pendent hinged blades $f'$, of springs $f^4$, substantially as shown and described.

6. The combination, with can B, of detachable locking-neck G, having an annular rack, H, and adapted and designed for engagement with a worm-wheel, I, gearing therewith, substantially as and for the purpose set forth.

7. The combination, with a rotatable can or vessel, of a swiveled support for its lower end, and anti-friction rollers or bearing-wheels $k^3$, located above and bearing down upon said can, thereby affording lateral support and preventing the can from lifting when rotating, said rollers being located on a ring, K, which fits on the tub A, substantially as shown and described.

8. The combination of tub A, swiveled tripartite support C, and can B, substantially as shown and described.

9. The combination of tub A, can B, swiveled support C, annular rack H, ring K, worm-wheel I, and anti-friction rollers or bearing-wheels $k^3$, substantially as shown and described.

10. The combination, with rotatable can B and vertically-reciprocating dasher D, of shaft O and its support, with gear-wheels secured to said support at one side of the can and its surrounding tub, a sliding collar secured to said dasher, and a pitman connecting said collar with said gearing, substantially as shown and described.

11. The combination, with wheel S' and dasher D, of pitman T, guide-rod P, slide-collar R, and arm R', said wheel S' being located to one side of and below the upper edge of the freezer-tub, substantially as shown and described.

12. In an ice-cream freezer, the combination, with the dasher D, sliding collar R, wheel S', and pitman T, of an adjustable wrist-pin on said wheel for varying the length of stroke of the dasher driven thereby, substantially as shown and described.

13. In an ice-cream freezer, the combination, with wheel S, of a rock-shaft, V, having a lever, V', with spring-pawl $v$, and arm $V^2$, carrying a pinion, $v'$, substantially as shown and described.

14. In an ice-cream freezer, the combination, with pinion $v'$, of an angular socket, $w$, and shaft W, having an angular head or end, $w'$, substantially as shown and described.

15. In an ice-cream freezer, the combination, with pinion $v'$, having socket $w$, and shaft W, having angular head or end fitted therein, of universal or flexible coupling Y and worm-wheel shaft $i$, substantially as shown and described.

16. The combination, with a rotatable can, B, having a dasher, D, and means for vertically reciprocating the same, of adjustable gear, substantially as described, whereby said can may be rotated, and which may be shifted or unshipped to allow the reciprocation of the dasher while the can stands still, substantially as shown and described.

In testimony that I claim the foregoing I have hereunto set my hand this 6th day of June, 1884.

GEORGE M. MILLS.

Witnesses:
 F. T. CLARK,
 M. D. CONNOLLY.